Patented Feb. 18, 1936

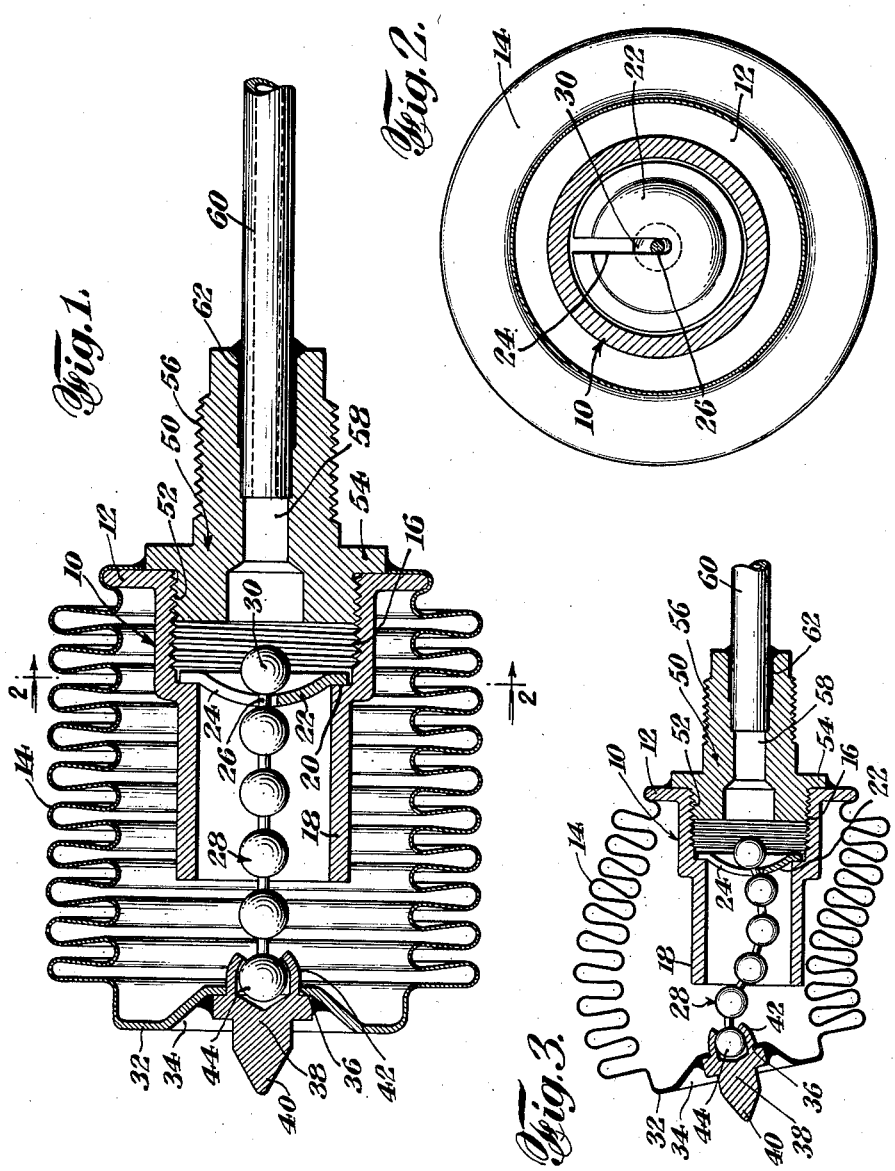

2,031,440

UNITED STATES PATENT OFFICE 2,031,440

BELLOWS THERMOSTAT WITH FLEXIBLE CONNECTING MEANS

Marshall H. Ward, Fairfield, Conn., assignor to Bridgeport Brass Company, Bridgeport, Conn., a corporation of Connecticut Application July 27, 1933, Serial No. 682,379

10 Claims. (Cl. 297—8)

This invention relates to a bellows thermostat provided with a flexible stop for limiting the expansion movement of the bellows.

One object of this invention is the provision of a device having a flexible connection between the bellows and a portion of the base of the device for limiting the expansion movement of the bellows while permitting twisting and substantial lateral displacement of the bellows from its axis during the operation.

To the accomplishment of the foregoing, and such other objects as may hereinafter appear, this invention comprises the construction, combination and arrangement of parts hereinafter described and then sought to be defined in the appended claims, reference being had to the accompanying drawing forming a part hereof, and which show merely for the purpose of illustrative disclosure, a preferred embodiment of my invention, it being expressely understood, however, that various changes may be made in practice within the scope of the claims without digressing from my inventive idea.

In the drawing:

Fig. 1 represents a longitudinal transverse cross section showing the bellows in expanded position;

Fig. 2 represents a transverse cross section taken substantially on line 2—2 of Fig. 1 showing the washer or plate which forms a securing or anchoring means for one end of the chain; and Fig. 3 represents a reduced sectional view showing the bellows in distorted position.

Referring now to the drawing, the reference character 10 designates a fixed base member having a flange 12 to which the stationary end of the bellows member 14 is secured by any conventional means such as solder. The base member 10 is formed with the internally threaded sleeve 16 that extends into the bellows member and which is set back a distance from the end to form the smaller sleeve 18 and to form the internal shoulder 20 at the junction of sleeves 16 and 18. Positioned within the sleeve 16 and adapted to abut shoulder 20 and be held thereby is the dished washer or plate member 22 which is provided with a radial slot 24 to receive the flexible connecting member 26 of the bead chain 28. It will be obvious from an inspection of the drawing that the slot 24 is smaller than the ball members on the chain and that when the bellows member is expanded the end ball member 30 at the inner end of the chain is prevented from outward movement by the washer or plate member 22 so that the washer or plate member forms an anchor for one end of the chain 28. The other end of the chain is secured to the movable end 32 of the bellows member 14. While I have shown a bead chain, I am not to be restricted thereto as other types of chains or similar flexible connections may be used. The end of the smaller sleeve 18 adjacent the movable end 32 of the bellows member forms a stop to limit the collapsing movement of the bellows member. It is to be noted that the sleeve 18 is made of such size as to accommodate the chain 28 when the bellows member is collapsed.

The movable end 32 of the bellows member is formed with a depressed portion 34 and an opening 36. Mounted within the opening 36 is the member 38 which has a projecting outer portion 40 and an inner socket portion 42 positioned within the bellows 14 for loosely receiving the end ball member 44 of the chain 28. The member 38 is secured in the opening 36 in the bellows member by any conventional means as for instance, solder to form an air tight joint. The projecting portion 40 of member 38 may be used as a valve member to seat in a valve seat or may be used to make or break an electric circuit.

Attached to the base member 10 of the device is a sleeve or plug member 50 provided with an externally threaded portion 52 which is threaded into the sleeve 16 and a flange member 54 which abuts flange member 12 on the base member 10. The sleeve member 50 is provided with the externally threaded portion 56 so that the device can be screwed into an opening in a tank or the like. Mounted within the opening 58 of the sleeve or plug member 50 is a tube 60 which is secured to the sleeve or plug member by means such as the solder 62. At its outer end the tube 60 is sealed so as to provide a closed system. The interior of the device is filled with an expansible and contractible fluid and the joints are all sealed to form an air tight construction. The bellows construction shown is especially adapted for use in connection with refrigerator control switches but it is to be expressly understood that my invention may be used with other types of bellows constructions for other uses.

The chain 28 forms a flexible means for limiting the expansion movement of the bellows member and prevents breakage or damaging of the bellows member due to internal pressure while it does permit twisting or lateral displacement of the bellows member on its axis to any desired extent. Also the flexible means is practically frictionless and forms a connection which is very well suited for the purposes set forth.

Bellows of the type shown in the drawing are usually filled with gas or operate from filling with gas under pressure. Unless some restraining means is provided, damage to the bellows will result. It is highly desirable that such restraining means should not interfere in any manner with ordinary operation of the bellows as a thermosensitive device, and such operation may include movement of an oscillatory nature which should be performed with as complete an absence of friction as possible. Where the restraining means is external to the bellows, as in the form of a clamp, quite a little inconvenience arises in handling the bellows during installation in a switch or valve. Where the restraining means is internal but composed of parts having spring characteristics there is a possibility of friction when the bellows is displaced from its axis.

From the foregoing it will be apparent that I have provided a relatively small and compact structure which utilizes a flexible connection between the bellows member and a portion of the base member.

What I claim is:

1. A device of the character described, including, in combination, a base member having a sleeve provided with a shoulder, a washer mounted within said sleeve and adapted to abut said shoulder, a bellows member on said base member, a flexible member secured at one end to said washer and at its other end to said bellows member for limiting the expansion movement of said bellows member.

2. A device of the character described, including, in combination, a base member having a sleeve provided with a shoulder, a washer mounted within said sleeve and adapted to abut said shoulder, a bellows member on said base member, a flexible member secured at one end to said washer and at its other end to said bellows member for limiting the expansion movement of said bellows member, said washer being provided with a radial slot for receiving a portion of said flexible member.

3. A device of the character described, including, in combination, a fixed base member provided with a sleeve, a bellows member having one end secured to said base member, and having its other end movable, said bellows member surrounding said sleeve, a laterally flexible, lengthwise substantially inextensible member within said bellows member and having one end secured to the movable end of said bellows member, and means associated with said sleeve for anchoring the other end of said flexible member, said flexible member being adapted to function as a flexible stop for said bellows member.

4. A device of the character described, including, in combination, a fixed base member having a sleeve provided with a shoulder, a washer mounted within said sleeve and adapted to abut said shoulder, a bellows member having one end secured to said fixed base member and having its other end movable, said bellows member surrounding said sleeve, and a bead-chain flexible member engageable at one end with said washer and attached at its other end to the movable end of said bellows member for limiting the expansion movement of said bellows member, said washer being provided with a radial slot wide enough to receive the chain between adjacent beads but not the beads themselves.

5. A device of the character described, including, in combination, a bellows supported for longitudinal expansion and contraction and to allow lateral flexing thereof, and a laterally flexible, elongated, limiting member inside the bellows secured to the ends thereof and forming a laterally flexible limit to the expansion of the bellows.

6. A device of the character described, including, in combination, a base member, a bellows on said base member with its other end free, a laterally flexible, elongated, limiting member within the bellows anchored at one end at the basal end of the bellows and attached at its other end to the free end of the bellows, said flexible member limiting the expansion of the bellows but permitting lateral flexibility thereof.

7. A device of the character described, including, in combination, a base, a laterally flexible bellows secured at one end on said base, a tubular member within said bellows at its basal end for limiting the collapsing movement of the bellows, and a laterally flexible, elongated, limiting member within the bellows attached to the free end of the bellows and extending freely into the tubular member to an anchorage at the basal end of the bellows, said tubular member being of sufficient capacity to receive the flexible member when the bellows is collapsed.

8. A device of the character described, including, in combination, a bellows supported for longitudinal expansion and contraction and to allow lateral flexing thereof, and a chain inside the bellows secured to the ends thereof forming a laterally flexible limit to the expansion of the bellows.

9. A device of the character described, including, in combination, a base member, a bellows member having one end attached to said base member and having its other end free, a laterally flexible, elongated, limiting member within said bellows member, said flexible member being anchored at its one end and attached at its other end to the free end of said bellows member, said flexible elongated member positively limiting the expansion movement of said bellows member while permitting lateral flexibility thereof.

10. A device of the character described, including, in combination, a base member, a bellows member mounted on said base member for longitudinal expansion and contraction and to allow lateral flexing thereof, and a chain within said bellows member and having one end anchored and its other end attached to one end of said bellows member, said chain forming a flexible stop for positively limiting the expansion movement of said bellows member.

MARSHALL H. WARD.

CERTIFICATE OF CORRECTION.

Patent No. 2,031,440.  February 18, 1936

MARSHALL H. WARD.

It is hereby certified that error appears in the printed specification of the above numbered patent requiring correction as follows: Page 2, second column, line 6, claim 4, after "receive" insert the words a portion of; and that the said Letters Patent should be read with this correction therein that the same may conform to the record of the case in the Patent Office.

Signed and sealed this 31st day March, A. D. 1936.

Leslie Frazer

(Seal)  Acting Commissioner of Patents.